Feb. 26, 1963   J. O. MELTON ETAL   3,079,184
BALL JOINT ASSEMBLY
Filed May 5, 1961

INVENTORS
JAMES O. MELTON &
THOMAS B. WILKINSON
BY
*Dunlap, Laney & Hubbard*
ATTORNEYS.

0

United States Patent Office 3,079,184
Patented Feb. 26, 1963

3,079,184
BALL JOINT ASSEMBLY
James O. Melton, 1208 Cruce St., Norman, Okla., and Thomas B. Wilkinson, 5925 S. Eggleston, Oklahoma City, Okla.
Filed May 5, 1961, Ser. No. 108,059
7 Claims. (Cl. 287—90)

This invention relates to ball joint assemblies, and more particularly, but not by way of limitation, to ball joint assemblies as they are applied to the front end suspension systems of automobiles.

In contemporary automobile manufacture, ball joint type bearings are widely used in the suspension systems connecting the steering column of the automobile to the front wheels in order to promote the ease with which the automobile may be steered, and also for the purpose of improving the riding quality of the automobile. Such ball joints are used, for example, in the pivotal coupling between the steering knuckles of the automobile and the steering control arm.

Ball joint bearing assemblies utilized in automobiles have been subjected to certain conditions of wear and usage which substantially shorten their effective operating life, and in many cases lead to reduced effectiveness in the assembly's function as a bearing. For example, the location of such ball joints beneath the automobile exposes them to contact with dust, mud and water, and the abrasive and corrosive influence of these materials soon tends to wear away the mating surfaces of the joints so that looseness and rattling develops in the assembly. Moreover, road shocks imparted to the joint during the travel of the automobile over particularly rough roads increase the frictional wear within the joint and also lead to the development of looseness and play relatively early in the life of the joint. With the development of such play in the ball joint assembly, the driver of the automobile necessarily has less control over its steerage than is desirable. Also, the smoothness of the ride which is afforded is considerably decreased, and undesirable rattling develops between the adjacent members in the ball joint assembly.

Numerous attempts have previously been made to construct ball joint assemblies which are less subject to wear and corrosive attack by deleterious substances by virtue of more complete enclosure of the ball member within its socket. The attempt has also been made to overcome such play and rattling by inserting some type of resilient member in the assembly for the purpose of constantly urging the ball member against one side of the socket member. Such constructions have more recently included a suitable compression spring of some type which is utilized in most instances in conjunction with a bushing made of resilient material such as natural or artificial rubber. The spring and bushing are pre-loaded by tightening a nut on the end of a stud extending through the bushing and spring from the ball member. In this construction, as the oscillating ball member portion of the joint becomes worn, or, conversely, as the bearing face of the socket containing the ball becomes worn, the compression spring and rubber bushing still function to retain the ball in contact with its socket.

Although the spring and rubber bushing arrangement has tended to reduce the play and rattling which develops in the ball joint over extended periods of usage, it has also had the detrimental effect of increasing the frictional resistance which the ball joint offers to relative movement between the members which it interconnects. The latter effect is usually quite pronounced, since in most assemblies it is necessary to highly compress the helical spring and bushing which are utilized. This results in the bushing, with its high coefficient of friction, exerting a very considerable drag upon the relatively moving parts with which it is in contact. Additionally, the use of such springs and bushings has not been effective to prevent the occurrence of wear and corrosion of the bearing surfaces caused by the entrance of deleterious materials into the socket member.

The present invention contemplates a novel ball joint assembly in which a helical compression spring is utilized for the purpose of constantly urging the ball member into contact with its socket. In this respect, there is some similarity between the present invention and those constructions which have been previously utilized for the purpose of reducing play and rattling in such ball joint assemblies. However, the present invention further includes a novel bearing assembly which is interposed between the helical compression spring and the outer periphery of the spherically shaped socket which contains the ball member. This bearing assembly, although resilient and therefore receptive to the high degree of pre-loading which is desirable in such ball joint assemblies, also is characterized by self-lubricating properties which enable it to function in minimizing the friction created by the large pre-loading forces which act in such assemblies. The arrangement of the novel bearing means with respect to the socket member is such that the ingress of deleterious foreign materials to the interior of the socket is substantially reduced.

In a preferred embodiment of the invention, the novel bearing means which is interposed between the helical compression spring and the outer peripheral surface of the metallic socket of the ball joint assembly comprises a plastic socket member positioned around and mating with the metallic socket in which the ball member is located, a plastic frusto-spherical washer complementary in configuration to the plastic socket member, a metallic liner interposed between the plastic washer and plastic socket, and a plastic thrust washer for transmitting thrust from the helical compression spring to the plastic washer. The plastics which are utilized are high density, synthetic resinous materials which are characterized by sufficient compressibility and resiliency to allow the plastic members to be slightly compressed during loading of the ball joint assembly. These plastic materials are also characterized by very low coefficients of friction to the extent that the plastic members may be described as self-lubricating in character. The low coefficient of friction which characterizes the several plastic components of the novel bearing assembly permits the member which is connected to the stud of the ball member to be turned quite freely relatively to the member which is connected to the metallic socket containing the ball member. Since the high density synthetic resinous materials which are utilized have a coefficient of friction which is much lower than that of synthetic or natural rubber, the binding or dragging effect which is obtained in the pre-loaded ball joint assemblies which include rubber bushings is avoided.

A number of additional advantages characterize the ball joint assembly of the present invention. One of the most important of these advantages is that which results from the configuration of the thrust washer employed, and from the plastic material which is utilized in the construction of the frusto-spherical washer, as opposed to that which is used in the thrust washer. Thus, the thrust washer is of a configuration which is complementary to that of the frusto-spherical washer and is constructed of a resinous material having a differing molecular structure than the resinous material from which the frusto-spherical washer is constructed. In this way, a large bearing area between two plastics of dissimilar molecular structure is obtained and the result is a substantial enhancement in the ease with which the members interconnected by the ball joint assembly may be turned relatively to each other.

Additionally, the interposition of a metallic liner between the frusto-spherical washer and the plastic socket member permits the ball joint assembly to be pre-loaded with a much greater compressive force, since the metallic liner greatly reinforces the frusto-spherical washer and permits the compressive and turning forces to be transmitted more evenly to, and over a larger area of, the plastic socket member.

Finally, the plastic socket member, by virtue of its complementary configuration and mating relationship to the metallic socket containing the ball member, affords a seal of the latter socket preventing the escape of the lubricant which is introduced into the metallic socket and the infiltration of dust, mud, water, and other deleterious materials to the interior of the socket.

From the foregoing discussion, it will be apparent that a major object of the present invention is to provide a ball joint assembly which may be pre-loaded prior to use to exert a force of large magnitude retaining the ball member in contact with its socket without introducing substantial frictional resistance to relative movement between the members interconnected by the joint.

An additional object of the present invention is to provide a ball joint assembly which effectively maintains the ball member of the assembly under constant tension and in constant contact with its socket member, thus assuring a bearing which is characterized by reduced slack and play.

A further object of the invention is to provide a ball joint assembly which will substantially reduce the infiltration of water, mud, dirt, and other deleterious materials to the interior of the ball joint socket member.

An additional object of the present invention is to provide a ball joint assembly which will not require adjustment after it has been installed upon the automobile.

A further object of the present invention is to provide a ball joint assembly which is of relatively greater mechanical strength and therefore susceptible of a higher degree of pre-loading than previous types of ball joint assemblies employing plastic elements in their construction.

Another object of the present invention is to provide a ball joint assembly which is simple and economical to produce, and which is characterized by a long and trouble-free service life.

These objects and advantages and other additional objects and advantages will become apparent and will be better understood by referring to the following description in conjunction with the attached drawings which illustrate our invention.

Figure 1:
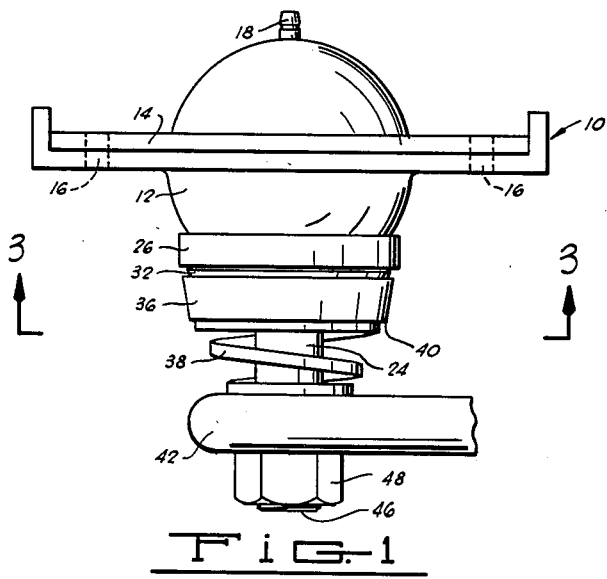
FIGURE 1 is a side elevation of a ball joint assembly constructed according to this invention.
Figure 2:
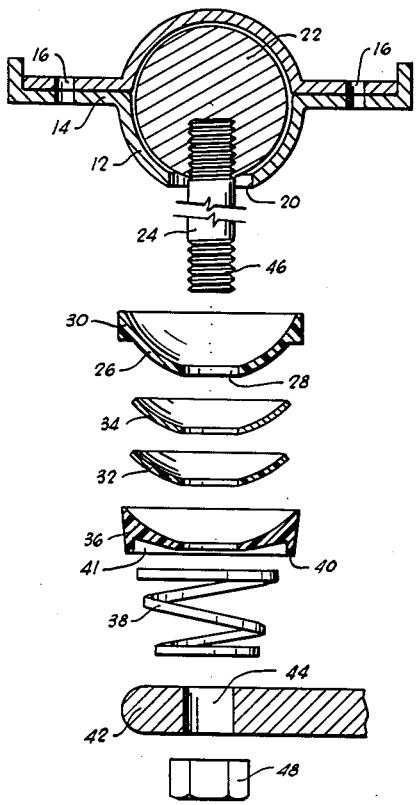
FIGURE 2 is an exploded vertical cross-sectional view of the structure shown in FIG. 1.
Figure 3:
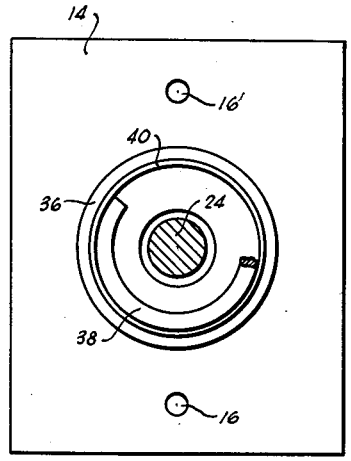
FIGURE 3 is a sectional view taken along line 3—3 of FIG. 1.

Referring now to the drawings in detail, and particularly to FIG. 1, reference character 10 generally designates socket means which is comprised of a generally spherical housing 12 having a planar flange member 14 secured to the outer periphery thereof. The flange member 14 is apertured, as indicated by reference character 16, to facilitate the attachment of the socket means to one of the two members of an automobile suspension system which are to be interconnected through the medium of the ball joint assembly. A grease fitting 18 is provided at the top of the spherical housing 12 to permit grease to be introduced to the interior of the housing. As shown in FIG. 2, the spherical housing 12 is provided with a generally circular opening 20 in its lower side. A ball member 22 which is disposed inside the spherical housing 12 is secured to a stud 24 which projects downwardly from the ball member through the opening 20 in the spherical housing 12.

A plastic socket member 26 which is constructed of a high density, synthetic resin material is positioned around the stud 24 below the spherical housing 12. The socket member 26 is frusto-spherical in configuration and mates with the outer peripheral surface of the spherical housing 12 when the ball joint is assembled in operative position as illustrated in FIG. 1. The circular opening 28 in one side of the socket member 26 is only slightly larger in diameter than the stud 24 so that the opening 20 in the lower side of the spherical housing 12 is substantially sealed by the resinous socket member. An annular flange 30 is provided around the upper edge of the outer periphery of the socket member 26 for a purpose hereinafter to be explained.

A frusto-spherical washer 32 which is complementary in configuration to the frusto-spherical socket member 26 is positioned around the stud 24 and, like the socket member 26, is constructed of a high density, synthetic resin material. A metallic liner 34 is interposed between the washer 32 and the socket member 26 and is also frusto-spherical in configuration to mate with the inner periphery of the washer 32 and the outer periphery of the socket member 26, with which surfaces it is in contact.

The final element of the novel bearing means used in the present invention comprises a thrust washer 36 which is interposed between the washer 32 and a helical compression spring 38 which is used to place the ball joint assembly under tension. The thrust washer 36 is characterized by a frusto-conically shaped outer peripheral surface and a frusto-spherically shaped inner peripheral surface which mates with the washer 32. The smaller end of the thrust washer 36 is provided with an annular, axially extending flange 40 which defines a cup-shaped recess at this end of the thrust washer. In actuality, the end of the thrust washer which is of smaller diameter is convex in configuration in correspondence to the concave frusto-spherical inner periphery of the thrust washer so that a groove 41 of generally V-shaped cross section is formed between the smaller end of the thrust washer and the annular flange 40. Although the material of construction of the thrust washer 36 is also a high density, synthetic resin, the molecular structure of the resinous material from which the thrust washer is constructed differs from the molecular structure of the plastic used for constructing the washer 32 and socket member 26. The reason for this difference of molecular structure will be subsequently explained.

The helical compression spring 38 which is used to pre-load the ball joint assembly is located between the thrust washer 36 and the member 42 of the steering assembly to which the ball joint assembly is connected. The convolutions of the spring 38 are of decreasing diameter from one of its ends to the other so that when the spring is highly compressed to pre-load the ball joint assembly, the convolutions may be telescoped inside each other. The largest convolution of the spring 38 which is located at one of its ends is of a diametric dimension such that it must be slightly contracted in order to fit in the groove 41 inside the flange 40 of the thrust washer 36. The member 42 is apertured as shown at 44 to accommodate the stud 24, and the end 46 of the stud is threaded to receive a lock nut 48.

An important aspect of the present invention resides in the particular materials of which the several elements of the ball joint assembly are constructed. As is now well known, certain synthetic resinous or plastic materials are characterized by very low coefficients of friction and high mechanical strength. These plastics are therefore especially well adapted for use in bearings. Among the high density, synthetic resinous materials which have been found to be especially well suited for such use are the long chain polyamides sold under the trade name Nylon, the high density polyethylenes and the polymerized halocarbons, such as those sold under the trade names Kel-F and Teflon. The coefficients of friction of these materials is sufficiently low that frequently very little or no lubrication of the bearing assemblies in which they are used is required.

We have found that such materials may be utilized to unexpected advantage in the construction of ball joint bearing assemblies of the type contemplated by the present invention. Such a ball joint assembly differs from the bearings in which such plastic materials have previously been used in that it must be highly pre-loaded or placed under substantial tension in order to prevent the development of looseness and rattling in the assembly. It is also very desirable that the materials of which the ball joint assembly is constructed be resistant to the corrosive and abrasive action of the deleterious road materials previously mentioned. We have found that high density, synthetic resinous materials of the type described are sufficiently corrosion resistant and possess sufficient mechanical strength to enable them to function very efficiently in such ball joint assemblies. Moreover, the resiliency of the materials is sufficient to permit them to be placed under compression without fracturing or permanent deformation, except over long periods of time.

Our investigations have further revealed that although the minimum frictional resistance to the turning of one member relative to the other is ordinarily afforded by contacting bearing surfaces which are each constructed of such plastic materials, some increase in the resistance to turning occurs when the contacting plastics are identical in molecular structure and the ball joint is heavily pre-loaded, as, for example, by completely compressing a heavy compression spring of the type shown in the accompanying drawings. This increased resistance to turning results from the interpolymerization of the identical molecules in the adjacent plastic surfaces which occurs when the plastics are subjected to the high pressure and frictional heat conditions appertaining in the highly pre-loaded bearing assembly. Such interpolymerization results in a "sticking" tendency between the adjacent bearing surfaces with a consequent reduction in freedom of movement.

In the present invention, the undesirable interpolymerization described is avoided by using two plastic materials of differing molecular structure for the two contacting bearing surfaces. The difference in molecular structure may be simply a difference in molecular chain length, but is preferably a difference in the chemical constitution of the molecules, since the latter difference results in a more complete suppression of the interpolymerization tendency. Thus, in a preferred embodiment of the invention, the thrust washer 36 and the washer 32 are constructed of different high density, synthetic resins, each of which is characterized in having a low coefficient of friction. Because of the relatively low cost of Nylon and polyethylene, we prefer to construct the thrust washer 36 of Nylon and the washer 32 of a high density polyethylene sold under the trade name Marlex. However, a suitable polymerized halocarbon may suitably be used in the construction of one of these members if desired. The plastic socket member 26 is also preferably constructed of Marlex.

The metallic liner 34 is provided for the purpose of reinforcing the washer 32 and to evenly distribute the load transmitted through the washer 32 to the socket member 26. This arrangement greatly improves the strength and durability of the ball joint assembly. In order to reduce the total weight of the assembly, as well as to provide improved resistance to corrosion, we prefer to construct the liner 34 of aluminum.

In the construction and operation of the invention, the ball joint is first assembled with the elements in the relation illustrated at FIGS. 1 and 2. The lock nut 48 is then tightened upon the stud 24 until the bearing is pre-loaded to the desired extent. The configuration of the helical compression spring 38 permits it to be compressed until all of the convolutions are completely telescoped inside each other and the spring occupies substantially a single plane. With the ball joint so assembled, a partial seal of the metallic spherical housing 12 is afforded by the bearing means which includes the plastic socket member 26, the metallic liner 34, the plastic washer 32, and the thrust washer 36. As the ball member 22 within the spherical housing 12 becomes slightly worn over extended periods of usage, the tension exerted by the compression spring 38 will cause the ball member to constantly bear against the inner surface of the spherical housing 12, and no looseness or rattling is permitted to develop.

As the automobile is being driven, the steering assembly member 42 is pivoted upon the stud 24 when the automobile is turned. The pivotal movement of the steering assembly member 42 is imparted through the spring 38 to the thrust washer 36 which moves rotatably upon the plastic washer 32. As has previously been explained, the bearing provided by the contacting plastics of dissimilar molecular structure offers very low frictional resistance to the turning movement so that steering of the automobile may be effected by the driver without difficulty. When the automobile moves over uneven road surfaces or strikes obstructions in the road, an oscillating movement will occur between the plastic socket member 26 and the spherical metallic housing 12, with a minimum of frictional resistance being offered to movement between these two members. The flange 30 around the socket member 26 retains the other elements of the bearing in alignment and prevents the metallic liner 34 and washer 32 from oscillating upon the socket member 26.

For illustrative purposes, this invention has been described as it particularly relates to automobile steering mechanism asemblies. It is, however, apparent that the principles of the invention may be adapted to any ball joint type bearing mechanism which is utilized to connect two relatively moveable members, whether used in automobile assemblies or otherwise.

It will be manifest to those skilled in the art that certain details of construction of the present invention may be modified or altered to meet certain existing operating conditions or needs without departing from the spirit and scope of the invention as defined by the appended claims.

We claim:

1. A ball joint assembly for pivotally interconnecting two members, comprising a hollow metallic housing of generally spherical configuration and adapted for connection with one of said two members, said hollow metallic housing having an opening therein; a ball member fitting in said housing; a stud of smaller diameter than said axial opening secured to said ball member and extending through said opening for connection to the other of said pivotally interconnected members; a high density, synthetic resin socket member of frusto-spherical configuration around said stud and mating with the outer surface of said housing; a frusto-spherical washer of high density, synthetic resin construction around said stud and complementary in configuration to said socket member; a frusto-spherical, metallic liner interposed between said washer and said socket member around said stud for reinforcing said washer and for evenly transferring force from said washer to said socket member; and a thrust washer constructed of a different high density, synthetic resin than said frusto-spherical washer around said stud and mating with said frusto-spherical washer for transferring thrust from the other of said pivotally interconnected members to said frusto-spherical washer.

2. A ball joint assembly as claimed in claim 1 wherein said first-mentioned high density, synthetic resin is polyethylene and said second-mentioned high density, synthetic resin is nylon.

3. A ball joint assembly as claimed in claim 2 wherein said metallic liner is aluminum.

4. A ball joint assembly as claimed in claim 1 and characterized further to include annular flange means around the outer periphery of said socket member for limiting the movement of said thrust washer on said frusto-spherical washer to rotative movement in predominantly a single plane extending normal to the axis of said frusto-spherical washer whereby said thrust washer may be rotated upon said frusto-spherical washer by forces acting in and parallel to said plane, and said spherical metallic housing may be pivoted in said socket member by forces acting normal to said plane.

5. A ball joint assembly as claimed in claim 1 wherein said thrust washer has a frusto-conical outer peripheral surface and a frusto-spherical inner peripheral surface complementary in configuration to said frusto-spherical washer.

6. A ball joint assembly as claimed in claim 5 and further characterized to include axially extending, annular flange means around said thrust washer and extending toward the other of said pivotally interconnected members; and a helical compression spring around said stud and having one of its terminal convolutions bearing against said flange means and the lower end of said thrust washer, and said spring further having its convolutions of decreasing diameter from one end of the spring to the other so that said convolutions are telescoped inside each other when said spring is fully compressed to impose a load on said ball joint assembly.

7. A ball and socket joint assembly comprising a first metallic member having a portion of its outer surface generally spherical; a high density, synthetic resin socket member having a frusto-spherical surface mating with the generally spherical surface of said metallic member; a frusto-spherical washer of high density, synthetic resin construction and complementary in configuration to the frusto-spherical surface of said socket member; a frusto-spherical metallic liner interposed between, and bearing against, said washer and said socket member for reinforcing said washer and for evenly transmitting force from said washer to said socket member; a thrust washer constructed of a different high density, synthetic resin than said frusto-spherical washer mating with said frusto-spherical washer for transmitting thrust to said frusto-spherical washer and forming a bearing with said frusto-spherical washer; a second metallic member; a stud rigidly connected to said second member and pivotally connected to said first metallic member and extending through said resin socket member, said first-mentioned resin washer, said metallic liner and said thrust washer; and resilient means interposed between said second metallic member and said thrust washer for biasing said thrust washer toward said frusto-spherical resin washer and away from said second metallic member.

References Cited in the file of this patent
UNITED STATES PATENTS

| | | |
|---|---|---|
| 2,018,365 | Klages et al. | Oct. 22, 1935 |
| 2,456,546 | Venditty | Dec. 14, 1948 |
| 2,912,267 | Latzen | Nov. 10, 1959 |
| 2,957,713 | Herbenar | Oct. 25, 1960 |